INVENTORS
JESSE W. BEAMS
EUGENE E. KINSEY
LELAND B. SNODDY, Dec'd
By Peoples National Bank,
Executor.
BY *J. D. O'Brien*
ATTORNEY INVENTORS.
JESSE W. BEAMS
EUGENE E. KINSEY
LELAND B. SNODDY, Dec'd
By Peoples National Bank,
Executor.

BY *G. D. O'Brien*

ATTORNEY

Oct. 12, 1954   J. W. BEAMS ET AL   2,691,306
MAGNETICALLY SUPPORTED ROTATING BODIES
Filed Jan. 30, 1951   6 Sheets-Sheet 5

INVENTORS
JESSE W. BEAMS
EUGENE E. KINSEY
LELAND B. SNODDY, Dec'd
By Peoples National Bank,
Executor.

BY *J. D. O'Brien*

ATTORNEY

Oct. 12, 1954　　　J. W. BEAMS ET AL　　　2,691,306
MAGNETICALLY SUPPORTED ROTATING BODIES
Filed Jan. 30, 1951　　　　　　　　　　　　6 Sheets-Sheet 6
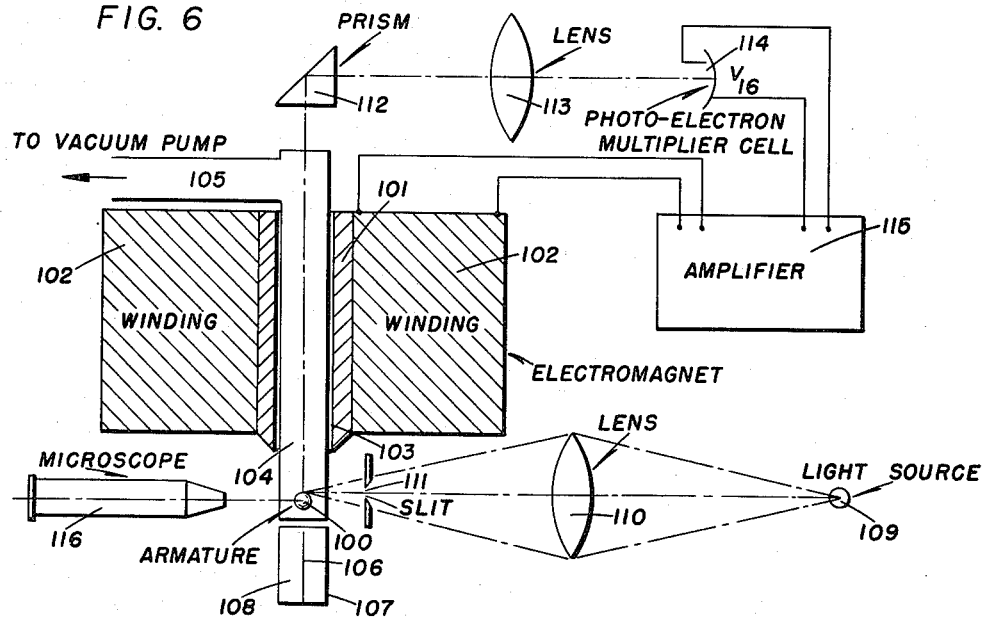
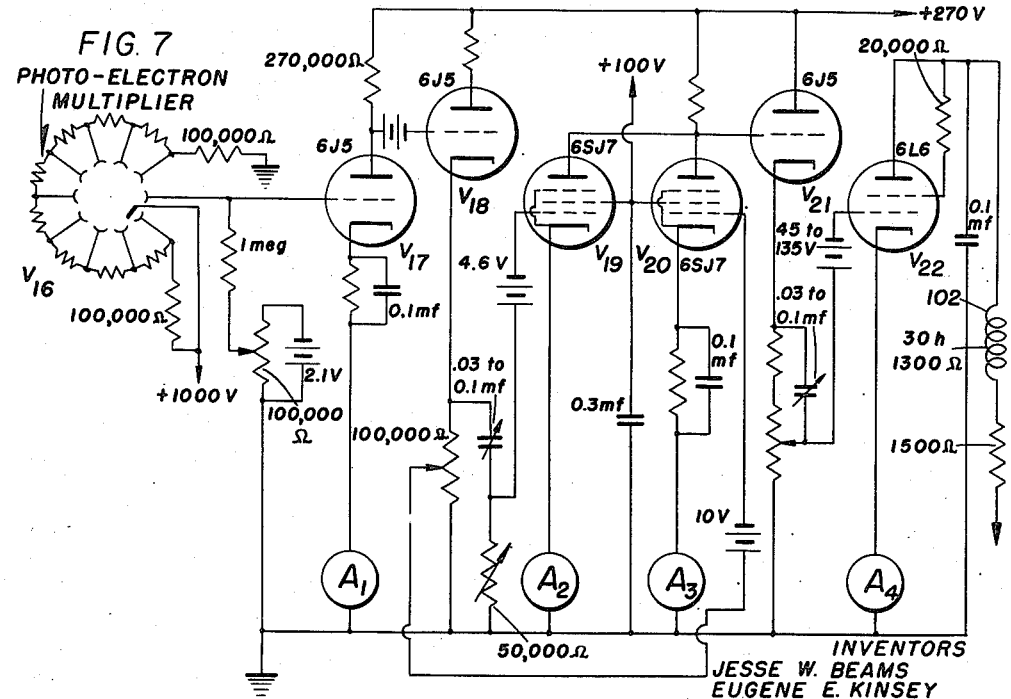
INVENTORS
JESSE W. BEAMS
EUGENE E. KINSEY
LELAND B. SNODDY, Dec'd
By Peoples National Bank,
　　　　Executor.
BY　*G. D. O'Brien*
　　　　ATTORNEY Patented Oct. 12, 1954

2,691,306

UNITED STATES PATENT OFFICE 2,691,306

MAGNETICALLY SUPPORTED ROTATING BODIES

Jesse W. Beams, Charlottesville, and Eugene E. Kinsey, Richmond, Va., and Leland B. Snoddy, deceased, late of Charlottesville, Va., by The Peoples National Bank, executor, Charlottesville, Va., assignors to the United States of America as represented by the Secretary of the Navy Application January 30, 1951, Serial No. 208,542

12 Claims. (Cl. 74—5.6)

The present invention relates to means for suspending and, in a modified embodiment, also rotating an object such as a mass of magnetic material in a gaseous medium, at normal atmospheric pressure or at reduced pressure, and completely out of contact with any solid or liquid, by suitable magnetic fields, thus markedly decreasing the resistance to mechanical motion of said object.

It is often desirable to provide a freely suspended body, herein for convenience designated as an armature or a rotor, and to eliminate friction from its suspending means. An ideal case could be that of an armature floating in a true vacuum. Unfortunately such ideal cannot be realized, first, because gravitation inevitably will pull the armature downward, and second, because a true vacuum cannot be attained. The present invention, therefore, provides apparatus and procedures for approaching the ideal conditions whereby the suspended armature, in some cases also provided with means whereby it may be put into rapid rotation, serves for various purposes, in making physical investigations, and for example, may act as a testing means for determining the strength of materials, as a gyroscope, and as an extremely delicate weighing balance.

Inasmuch as the suspended armature is not in contact with any solid or liquid support, the frictional resistance to its spinning motion is very small, and moreover said resistance may be reduced practically to zero, by evacuating the container for the gas, to any available extent, so that the armature virtually is suspended in free space.

As a consequence, tremendous rotational speeds of said armature may be attained when so desired, and once the armature is set into such rotation, its spin will persist with negligible loss of speed for many hours. Heretofore gyroscopes required solid bearings, with consequent friction, even though ball bearings were used. Similarly, weighing scales required mechanical supports, such as knife-edges or other pivots, which likewise introduced friction, with resulting limitation of the sensitivity of weighing. Such friction may be almost completely eliminated by the present invention.

An object of the present invention, therefore, is to provide means for suspending and rotating an armature in a gaseous medium at very low pressures.

Another object is to provide means for suspending and rotating an armature in a nearly perfect vacuum, whereby resistance to the motion of said armature is practically eliminated.

A further object is to provide means in which the freely suspended, high speed rotating armature will serve as a gyroscope rotor.

An additional object is to provide means whereby a suspended armature will act as an ultra-sensitive weighing device or balance.

A still further object is to utilize the centrifugal forces developed by the high speed armature in a mechanical testing device.

Another object is to utilize the suspending and rotating means to support and spin an article while a coating is being applied thereto.

Still another object is to provide prismatic reflecting means constituting or carried by an armature for use in making physical investigations by means of light rays.

Other objects and many of the attendant advantages of this invention will be appreciated readily as the same becomes understood by reference to the following detailed description, when considered in connection with the accompanying drawings, wherein:

Fig. 3a is an alternative circuit that may be used in place of that shown in Fig. 3;

Fig. 6 is a diagrammatic illustration of a modified form of the invention, capable of suspending very small armatures;

Fig. 7 is a circuit diagram relating to said modified form;

Figure 1:
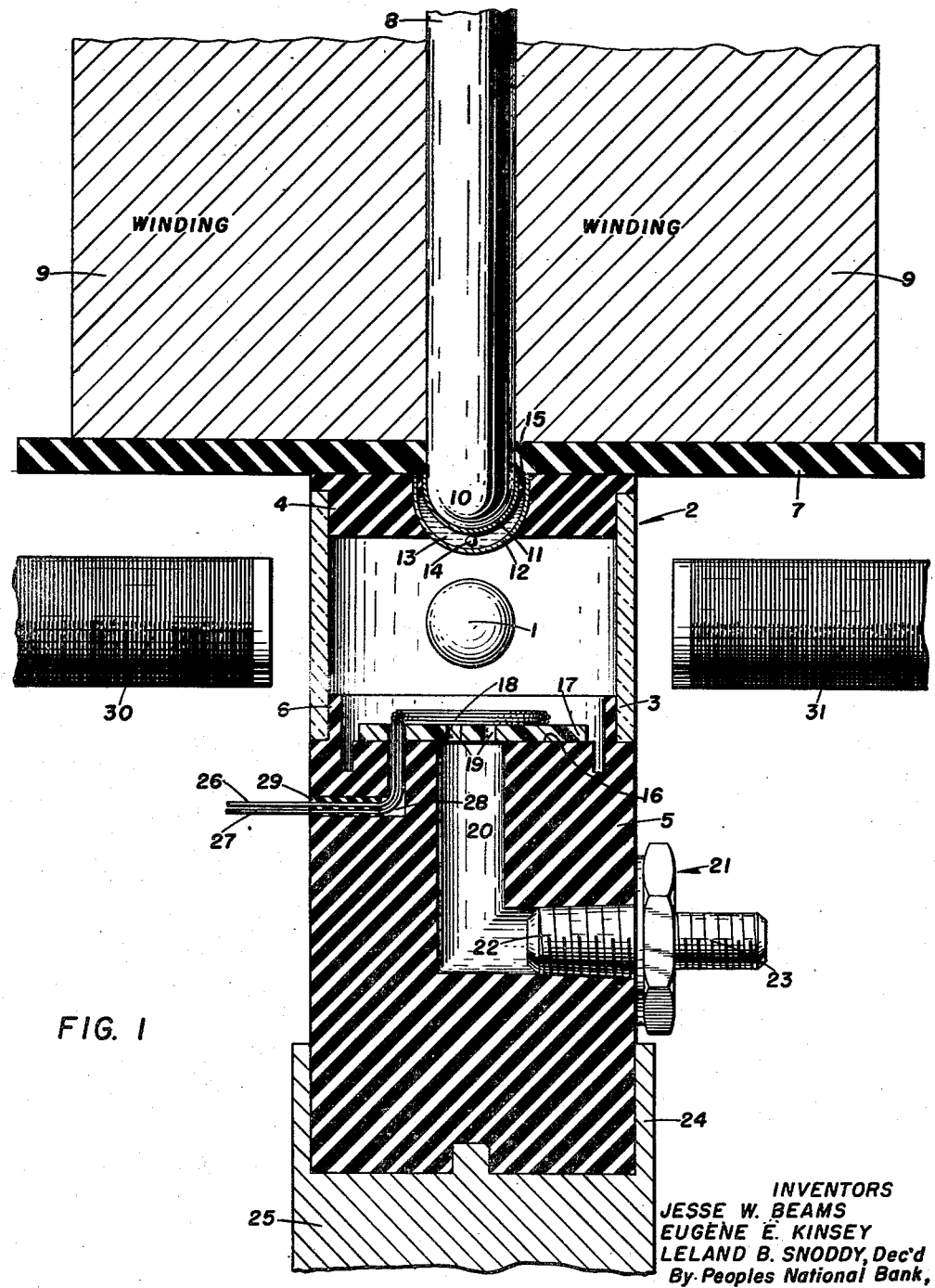
Fig. 1 is a vertical axial section showing an armature suspended by an electromagnet according to the invention.

The invention can be described best by conveniently considering it as made up of a number of cooperating units each of which has a definite purpose, as follows: 1. An enclosing vessel containing the armature that is to be suspended and rotated, together with a suitable vacuum-producing system whereby the gas pressure in said vessel may be reduced to any feasible limit. 2. An electromagnet having a vertical magnetic field and located above the armature to exert an upward force thereon. It is, of course, requisite that the armature consist at least in part of ferromagnetic material, in order that such attractional force may be produced. 3. Stabilizing or governing means that controls the magnitude of the magnetic force, to maintain said force exactly at the proper intensity to hold the armature at the desired level. 4. Means for producing a rotating magnetic field at the location of the armature, whereby said armature may be caused to spin, as the rotor of an alternating current motor of the induction type. 5. Means for measuring the speed of rotation. 6. Means for measuring the vertical position of the armature.

In addition to the above-enumerated main components of the invention, certain auxiliary devices are provided, such as suitably designed power supplies, and a supporting frame for use when the rotating armature is to serve as a gyroscope rotor.

Taking these components up as far as possible in sequence, and referring first to Fig. 1, there is shown a sphere 1 made of ferromagnetic material, constituting an armature and normally designed for rotation at high speeds, and therefore hereinafter sometimes called the rotor. The rotor 1, which may suitably be a steel ball, such as is used in ball bearings, is located in a closed chamber 2 having a transparent cylindrical wall 3 through which said rotor may be observed. This chamber is hermetically closed at the top by a flanged disk 4 and at the bottom by a cylindrical block 5 having a flange 6 fitting tightly within the wall 3.

Figure 4:
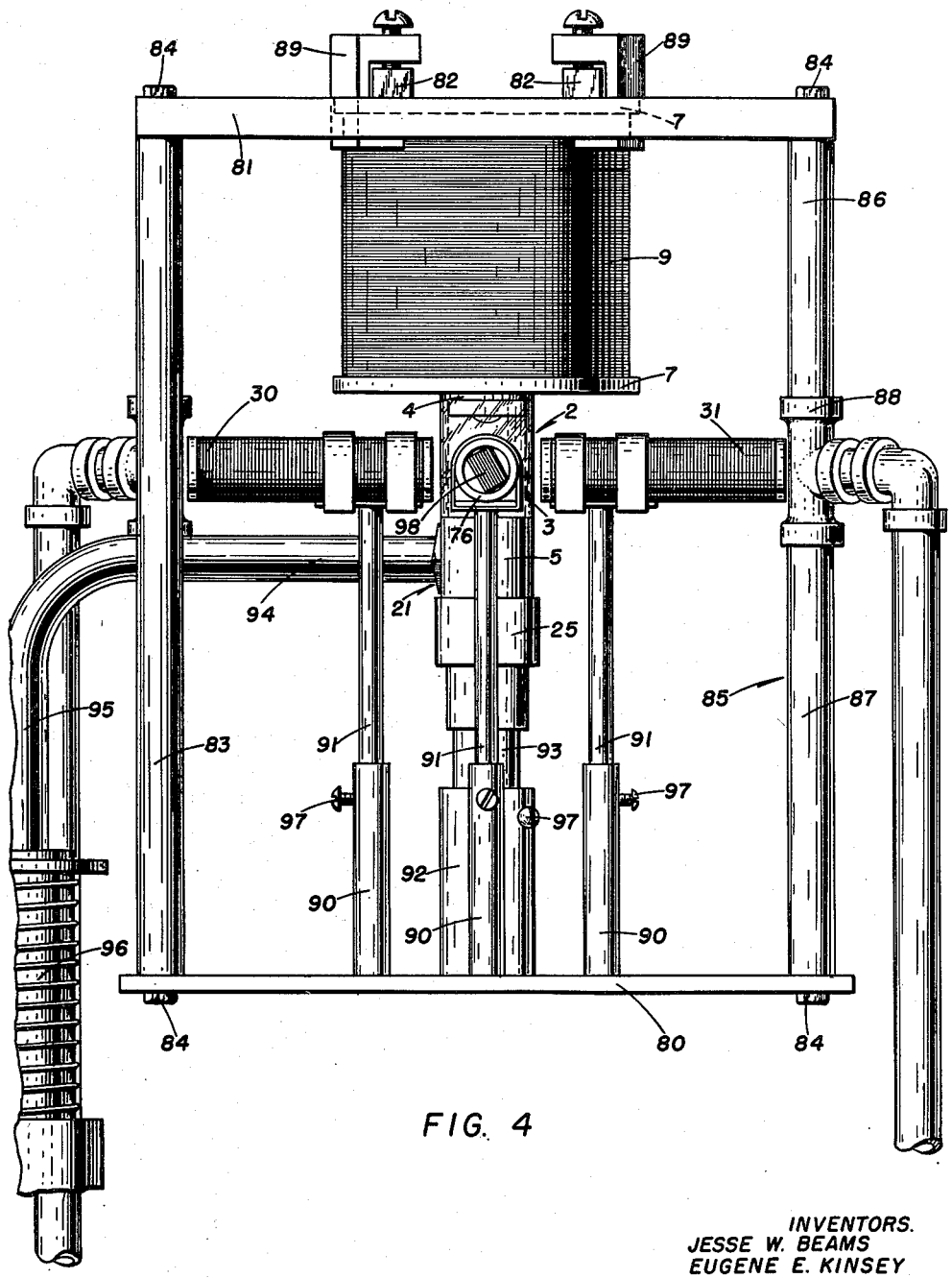
Fig. 4 is an elevation, partly broken away, of a gyroscope embodying the invention.
Figure 5:
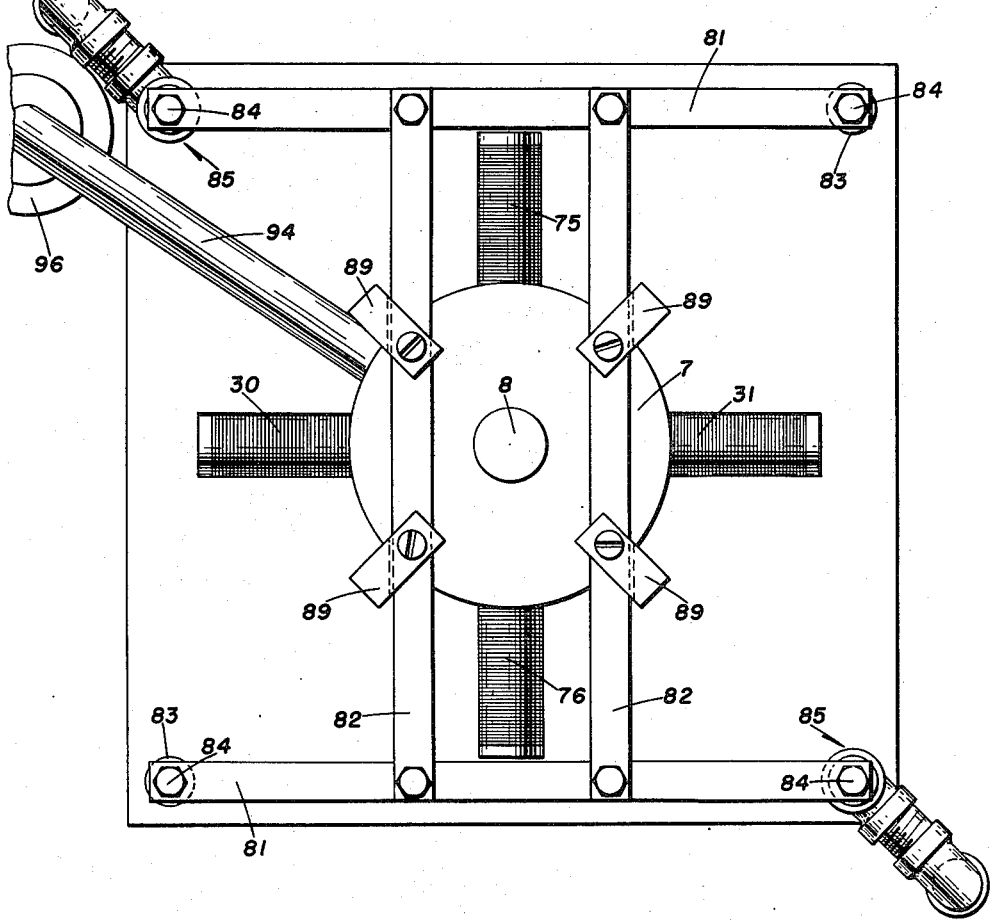
Fig. 5 is a plan view of the apparatus shown in Fig. 4.

Resting on disk 4 is the lower bobbin end-plate 7 of an electro-magnet, which comprises a ferromagnetic core 8 and a winding 9 surrounding said core and confined between lower bobbin end-plate 7 and a similar upper bobbin end-plate 7 shown in Figs. 4 and 5. The lower end 10 of core 8 is hemispherically-shaped as shown and extends down into a central hole in disk 4. A cap 11 of non-magnetic material, such as brass, covers the end 10 and a similar but somewhat larger cap 12 is located below cap 11 and suitably spaced therefrom, to form a container for a damping liquid 13 in which is submerged a small steel ball 14. A collar 15 fits between the upper ends of the two caps. The hermetic closure of the top end of chamber 2 is preserved by a close fit between disk 4 and cap 12.

Block 5 has a flat upper surface 16 upon which rests the pick-up coil assembly, consisting of the disk 17 of non-magnetic material and the pick-up coil 18, said coil being below the rotor, but reasonably close thereto, and coaxial with the core 8. The disk 17 has one or more holes 19, establishing communication between the interior of chamber 2 and a bore 20 in the block 5, said bore terminating in a fitting 21 whose inner threaded end 22 is screwed air-tightly into the block 5 and whose outer threaded end 23 is designed to be connected to a conventional means for providing and adjusting the degree of evacuation within the rotary chamber 2, said means comprising a mechanical pump and a diffusion pump having pressure measuring means and a valve associated therewith, as is customary. The block 5 may be mounted in any suitable way, for example, within a cylindrical flange 24 formed at the upper end of a supporting rod 25. The conductors 26 and 27 leading to the coil 18 are brought out through a bore 28, which is hermetically sealed by packing 29.

Two pairs of opposed windings are provided to produce a rotating electric field in chamber 2. Only one pair, consisting of the two oppositely placed windings 30 and 31 is visible in Fig. 1. Both pairs, however, are seen in the wiring diagram, Fig. 3, and will be discussed hereinafter.

Figure 2:
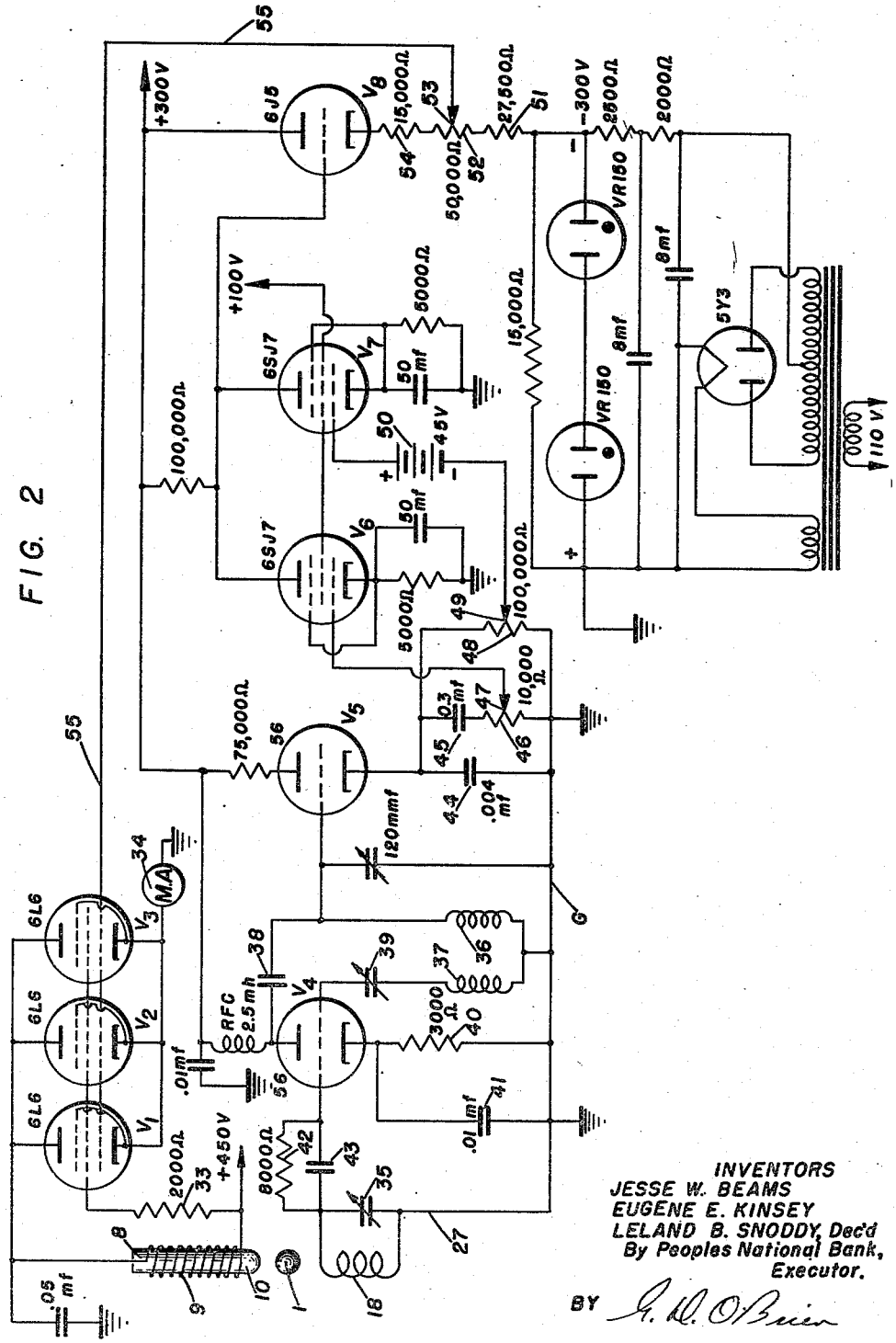
Fig. 2 is a circuit diagram showing electrical components and connections in and associated with the apparatus shown in Fig. 1, for keeping the armature suspended.

Referring now more particularly to Fig. 2, the armature or rotor suspending circuit will be described. The rotor 1 is here shown just below the lower rounded end 10 of the ferromagnetic core 8 of the electromagnet, said core being magnetized by the current in winding 9. This current conveniently is the combined anode current of a suitable number of parallel-connected beam power tubes, three of which, $V_1$, $V_2$ and $V_3$, are shown in the diagram. While in the apparatus as used, these actually consisted of a group of three parallel-connected type 6L6 tubes, which yielded sufficient anode current for proper actuation of the suspension magnet, it will be understood that this is merely illustrative, and that more or fewer may be used in other installations.

As indicated on the drawing, one end of the winding 9 is connected to the positive terminal of an approximately 450 volt source of anode energy, the other end of said winding 9 being connected to the anodes $V_1$, $V_2$ and $V_3$. The screens of the group of 6L6 tubes are connected to the positive terminal of the same source through a 2,000 ohm resistor 32. A milliammeter 34 is connected in series at a low potential location in a cathode lead, to indicate the combined anode currents with sufficient accuracy.

The pickup coil 18 need have only a few turns; a winding having seven turns was actually used. This coil is connected as shown, in parallel with a variable capacitor 35 in the grid-cathode circuit of a thermionic tube, $V_4$, which in the present instance, is indicated as a triode of type 56.

This tube $V_4$ is connected into an oscillation circuit comprising essentially an anode inductance 36, and a grid inductance 37 connected thereto, with a blocking capacitor 38 in the anode circuit and a variable tuning capacitor 39 in the grid circuit, all as shown. The usual cathode resistor 40 and by-pass capacitor 41 are provided for biasing, and a grid "leak" resistor 42 and a grid capacitor 43 are likewise provided. The circuit including pickup coil 18 and capacitor 35 thus acts as a shunt of the oscillator grid circuit, whereby the "Q" of said pickup coil circuit influences the output of the oscillator tube $V_4$.

This output is amplified by being fed into the grid of a second thermionic tube $V_5$, which operates in a cathode follower circuit. This tube is likewise a triode, here of type 56. It will be seen that there are three electrically paralleled paths connecting the cathode of $V_5$ to the ground wire G. At the left in Fig. 2 is a purely capacitive path including the small capacitor 44. The central path includes a much larger 0.3 mfd. capacitor 45, in series with a 10,000 ohm resistor 46 having a sliding contact 47 coacting therewith. The right hand path is purely resistive, containing a 100,000 ohm resistor 48 having a sliding contact 49. It will be clear that in the central path including capacitor 45 and resistor 46 only pulsating or alternating current can flow, while all the direct current must flow through the high-resistance 48 of the right hand path. The central path will be designated hereinafter as the error-derivative path, while the right hand path will be called the error signal path; both coact to control the vertical position of the armature 1.

The group of paralleled tubes $V_1$, $V_2$, and $V_3$ is controlled by the voltage applied in common to their control grids, derived from an amplifier that will now be described in detail, starting from the pickup coil 18 below the armature 1. It will be understood that both the inductance and the "Q" of coil 18 will vary with the position of armature 1 with respect to said coil. The triode $V_4$, as already mentioned, is shown connected as an oscillator of the tuned grid, tuned anode type. Coil 36 is connected in the anode circuit of $V_4$, while coil 37 is connected in its grid circuit. These coils may or may not be mutually inductively coupled, as preferred. The coil 18 likewise is connected in the grid circuit of $V_4$ and hence the above-mentioned variations in its characteristics will affect the operation of the oscillator circuit.

The slider 47 is connected directly to the control grid of a triple grid tube $V_6$ here of type 6SJ7, while the slider 49 is connected to the control grid of a similar tube $V_7$ through a voltage source 50, shown as a 45 volt battery with its positive terminal connected to said grid. The anodes of the tubes $V_6$ and $V_7$ are connected jointly to the grid of a triode $V_8$, illustrated as a 6J5. Suitable voltages supplied to the anodes of the various tubes mentioned are suggested by the numerical data on the drawings, and are understood to be merely illustrative and not restrictive in any way. Conventional cathode resistors and by-pass capacitors are provided for $V_6$ and $V_7$ as indicated.

The triode $V_8$ is connected to act as a cathode follower. For this reason, its anode is connected directly to the positive terminal of a source of electricity supplying 300 volts, whereas resistors are provided in series in the cathode lead, which is connected to the negative terminal of a carefully adjusted auxiliary power supply delivering electricity at 300 volts, and whose positive terminal is grounded. Thus the total voltage drop between the anode and said negative terminal is 600 volts. The resistors in said cathode circuit comprise a fixed resistor 51 of 27,500 ohms connected at one end to the —300 volt terminal, and at its other end to one end of a 50,000 ohm resistor 52 having a sliding contact 53 thereon, the remaining end of resistor 52 being connected to the cathode of $V_8$ through another fixed resistor 54 of 15,000 ohms. The sliding contact 53 is connected to the paralleled control grids of $V_1$, $V_2$, and $V_3$ through conductor 55. The sliding contact 53 permits adjusting the negative bias of the said control grids, preferably in an operating range of about zero to —70 volts, with respect to the ground, this bias depending on the mass and position of the armature that is to be suspended. Details of a suitable auxiliary power supply are shown on the drawing, but it will be understood that this power supply may be of a conventional type and does not itself constitute a part of the invention.

Figure 3:
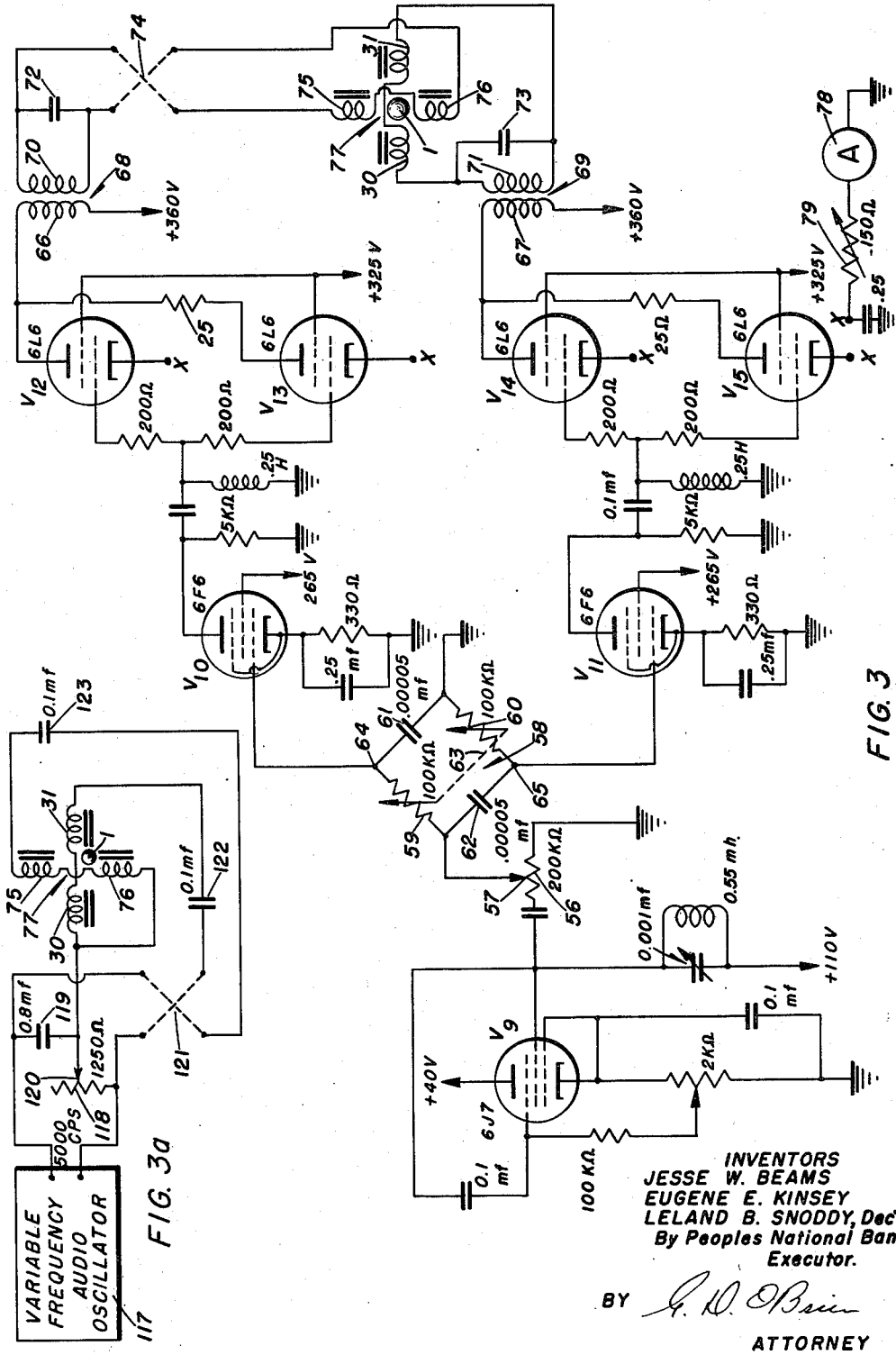
Fig. 3 is a circuit diagram showing the electrical connections of the apparatus for imparting rotation to the armature.

The spinning of the armature 1, when it is to act as a rotor, is accomplished by providing a revolving magnetic field, by means of two-phase current. This current is generated by a single oscillator that is connected to a phase splitting network which yields two sets of oscillations that are thus kept perfectly synchronized and in quadrature with each other. The circuits used are shown in Fig. 3.

The oscillator circuit here is of the type called a "Transitron," or "Negative Transconductance Oscillator," and is illustrated as based on $V_9$ which may suitably be a pentode of type 6J7. In this circuit, the control grid is tied directly to the cathode, the number 3 grid is biased slightly below cathode potential, and a much higher voltage is applied to the second grid than to the anode. Circuit details and suitable numerical values of the components and the applied voltages are indicated on the drawing, although it will be understood that considerable variations are permissible.

The output of this oscillator passes through a 200,000 ohm resistor 56 having a sliding contact 57 whereby any desired portion of the voltage drop through said resistor 56 may be supplied to the phasing bridge 58. This bridge has variable resistors 59 and 60 in two opposite arms, and fixed capacitors 61 and 62 in the remaining pair of opposite arms. The resistors may suitably be of the order of 100,000 ohms each, and have their controls mechanically ganged as indicated at 63, so that the resistors will remain substantially equal to one another at all settings of the controls. The capacitors are here of the order of 50 mmfd. each, as shown, although these values depend somewhat on the frequencies involved.

By proper manipulation of the control 63 the bridge may be so adjusted that the alternating current outputs derived from terminals 64 and 65 are in quadrature. These terminals are connected respectively to the control grids of $V_{10}$ and $V_{11}$, which are shown as pentodes of type 6F6. After amplification by these two tubes, further amplification is provided in each case by two paralleled 6L6 tubes $V_{12}$, $V_{13}$, and $V_{14}$, $V_{15}$, which yield sufficient power to spin the rotor 1, as will now be described.

Each pair of tubes $V_{12}$, $V_{13}$ and $V_{14}$, $V_{15}$ has a common output, tubes $V_{12}$, $V_{13}$ serving to energize a winding 66 and tubes $V_{14}$, $V_{15}$ energizing a corresponding winding 67, which constitute the primary windings of transformers 68 and 69 respectively. The secondary winding 71 of transformer 69, shunted by a capacitor 73, feeds in series the windings 30 and 31 of the rotor spinning means 77. The secondary winding 70 of transformer 68, shunted by a capacitor 72, feeds the remaining windings 75 and 76 of said rotor spinning means, through a reversing switch 74. A current meter 78 connected in series with a variable resistor 79 is connected into the cathode circuits of $V_{12}$, $V_{13}$, $V_{14}$ and $V_{15}$ through their common point $x$ whereby said meter 78 reads the total cathode current of all four tubes, which is approximately the same as the total anode current, but has the advantage that the meter circuit is substantially at ground potential.

A simplified circuit for providing the revolving magnetic field is shown in Fig. 3a, wherein a variable-frequency audio oscillator 117 has a capacitor 119, connected in series with a variable resistor 118, connected across its output whereby proper adjustment of the resistor 118 will produce two voltages in quadrature due to the phase shift provided by the capacitor. The slider 120 which is the common terminal of the capacitor and the resistor, is connected to the common junction of windings 30 and 76 while the outer terminals of windings 75 and 31 are connected through capacitors 123 and 122 and the reversing switch 121 to the oscillator output terminals.

Referring next to Figs. 4 and 5, there is shown one practical application of the invention, namely, its use in a gyroscope. The apparatus here illustrated comprises a base or platform 80, and a built-up upper frame 81, 82, spaced a desired distance from the base by columns at the four corners of said base. Two diagonally opposite columns 83 may be continuous from end to end, and are secured by cap screws 84. The other two columns 85 are each conveniently made of several pieces 86, 87 of tubing or rod with a T 88 connecting said pieces. Pipe and pipe fittings may be used advantageously.

The pieces are made of such lengths that the center line of the horizontal parts of the two T's 88 will pass through the center of the rotor 1 whereby the position of said rotor relatively to the rest of the apparatus does not change upon tilting the platform and the elements carried thereby about said axis.

The said elements include the magnet 7, 8, 9, which is shown clamped to the cross bars 82 of the upper frame by clamps 89, the rotor enclosure 2, the windings 30, 31, 75 and 76 for creating the revolving magnetic field for spinning the rotor and the adjustable supports 90, 91, 92 and 93 for the above-named elements.

To provide flexibility, the vacuum pump 96 has its suction pipe 95 connected to the interior of the enclosure 2 by a flexible tube 94, connected to fitting 21. Adjustment of the lengths of the various supports 90, 91, 92 and 93 is provided by the set screws 97 that hold the sliding rods 91 and 93 in position. Thus for instance the various windings 30, 31, 75 and 76 may be alined properly with the rotor 1. Each of these windings preferably has a laminated iron core, one of which is shown in end view at 98, Fig. 4.

Referring next to Figs. 6 and 7, there is illustrated a modified form of the invention that is advantageous when very small armatures are to be employed. This modification utilizes light rays in place of variation of inductance or "Q," and employs a photoelectric device to detect the changes in light reflected from the armature and convert them into electrical control signals for use in stabilizing the position of said armature.

Fig. 6, which is diagrammatic, illustrates the structure and principles involved in stabilizing the small armature 100. It will be understood that this armature, like the rotor 1 of Fig. 1, must contain sufficient magnetic material to make it possible for the field of the electromagnet core 101 to suspend it. The details of the magnet winding 102 will be governed by the ampere-turns required to magnetize said core, which unlike that of Fig. 1, must here have a passageway 103, to make it possible for light to pass therethrough, for a reason that will become evident hereinafter.

Within the passage 103 is a tube 104 that preferably is made of glass or similar transparent material, capable of being evacuated, through the connection 105 leading to a suitable vacuum-producing system. Below the armature 100 is a stabilizing and damping means for said armature, comprising a slender wire 106 of magnetic material, such as iron, and an enclosure 107 for said wire, containing also a damping liquid 108 of proper viscosity to restrain and steady the wire whenever lateral excursions of the magnetized armature 100 tend to move it.

The armature 100 is illuminated strongly by light from a horizontal line source 109, which is so placed with respect to a condensing lens 110 that the armature 100 and source 109 are at conjugate foci thereof. The rays from the source 109 will form a horizontal line image at the location of armature 100, and in the immediate vicinity of said armature will form substantially a horizontal plane of light. If desired, the light may be further restricted by means of a narrow slit 111.

The armature 100 will reflect and scatter the light received from said source 109, and the amount thus reflected and/or scattered will depend among other things on the vertical position of the armature.

A reflector, here shown as a total-reflection prism 112, is located to receive light scattered from the armature and transmit it horizontally through a condensing lens 113 to a photo-electron multiplier cell 114, and thus produce an electrical signal which is used as the input of an amplifier 115. This amplifier supplies the magnetizing current to the winding 102, and is so connected that said current decreases when the armature rises, thus ensuring stable suspension of said armature. Rotation of the armature, if desired, may be secured by the same means as in Fig. 1. A microscope 116 is provided for measuring the height, that is, the vertical position of the armature.

While it is possible to devise many ways in which the photo-electric signal may be amplified for the present purpose, one suitable amplifier circuit is shown in Fig. 7. In this circuit there is provided a photo-electron multiplier tube $V_{16}$, of type 1P28, to constitute the light-sensitive cell 114 of Fig. 6, although both 931A and 1P21 tubes have also been used successfully. It is advantageous to select tubes that have the least possible "dark" current, and with very small armatures it was furthermore found desirable to keep the photo-tube $V_{16}$ at Dry-Ice temperature to minimize the inherent tube "noise."

The anode of $V_{16}$ was kept at a carefully regulated constant voltage of the order of 1,000 volts. The circuit is self-explanatory, in that all the connections are shown and suggested tube types are indicated, as well as the electrical magnitudes of all important resistors and capacitors, and other circuit elements. Current measuring instruments $A_1$, $A_2$, $A_3$ and $A_4$ may be connected in certain of the cathode leads, near the grounded end of the high voltage circuits, to minimize danger to the operator.

Certain differences exist between the characteristics of the two types of armature suspension devices herein disclosed, namely the pickup coil type illustrated in Fig. 1 and the photoelectric type shown in Fig. 6. Among these differences an important one is that while the pickup coil type is very satifactory for use with armatures that are not very small, and has a relatively simple suspension circuit that is stable and easily adjusted, it fails when the armature is too small to influence the magnetic suspension flux sufficiently to assure proper operation of the pickup coil and also to assure the desired stabilizing action of the armature damping means.

The photoelectric type has the advantage that its operation is not dependent upon a pickup device, but merely on the light reflected or scattered by the armature, and hence will be effective even with very small armatures that cannot materially alter the flux distribution of the suspending magnet. Of course, adjustment and operation become more difficult and tedious with small armatures and when the diameter of the latter is reduced below about 20 mils additional difficulties arise in adjusting the damping wire 106. This wire is made of smaller diameter than the armature and usually is submerged in water for damping. If the armature is in rapid spin, additional difficulty occurs due to the fact that any sudden vertical motion may set said armature into horizontal oscillation, especially if the axis of the suspending field is not exactly vertical and hence it is highly desirable that all the power supplies of the electronic circuits should be well stabilized and that the spinning armature be kept free of vertical motion.

While the large armatures are usually rotated, the small ones often are merely suspended without simultaneous rotation, in accordance with different purposes. It was found that when a small armature is suspended magnetically initially in air at relatively high pressure, such as atmospheric pressure, the armature will fall progressively while the enclosure is being evacuated. This effect was found to be due to the buoyancy of the atmosphere in which the armature is submerged. This effect is extremely delicate.

The change in level of the armature upon variation in gas pressure may readily be observed by means of the microscope 116, suitably of about 30 power magnification, which is focused on any natural or artificially produced mark appearing on the armature. Very minute variations in buoyancy are thus made evident, for example, with an armature in the form of a steel sphere $\frac{1}{64}$ inch in diameter, whose volume is $3.36 \times 10^{-5}$ cubic centimeters and whose weight is $2.6 \times 10^{-4}$ grams, it was found that the weight change that occurred when the pressure was reduced from atmospheric to below $10^{-5}$ mm. of mercury was of the order of a few billionths of one gram. Thus the apparatus may be used as a balance for detecting extremely small changes in weight. Calibration may be made by means of the current measuring instrument $A_4$ in series with the suspension magnet winding 102. Armatures as small as 4 mils in diameter have been employed.

The speed of rotation of the spinning armatures may be measured by a photoelectric pickup with or without stroboscopic auxiliary devices, when the armature diameter is 20 mils or more. This is accomplished by conventional circuits, but fails when the armature is much smaller. No satisfactory direct speed measuring procedure has been found for such small rotors, but if they are accelerated for sufficiently long periods of operation as induction motor rotors, they will finally "lock in" and spin synchronously with the revolving field, whose frequency may of course be determined by well known frequency meters, and indirectly will indicate the spin rate. Thus the $\frac{1}{64}$ inch sphere was rotated at an estimated speed of 800,000 revolutions per second without exploding by its centrifugal force, a centrifugal field at its periphery in excess of a half-billion times gravity.

It should be noted that the apparatus shown in Fig. 6 may be operated in two distinct ways. The first way is as shown with the armature illuminated at its upper portion, in which case the light scattered by said armature increases as the armature rises, thus increasing the light received by the photoelectron multiplier $V_{16}$ and, due to the amplifier phase relations, diminishing the output current of $V_{22}$ which energizes the suspension magnet winding 102 and allowing the armature to drop until equilibrium is reestablished. To avoid oscillations use is made of the derivative signal generated by the derivative circuit consisting of the variable resistor-variable capacitor combination which furnishes a component of the control grid signal of $V_{19}$.

This derivative circuit signal may be adjusted to be 70° to 90° out of phase with the original signal, and thus when mixed therewith and applied to the grid of $V_{19}$ it damps the oscillations.

The second way of operating the apparatus is to eliminate entirely the first stage of amplification, containing tube $V_{17}$, in which case the suspension circuit will operate just as satisfactorily but with opposite phase relations, so that as the armature moves out of the light beam the current through the winding 102 decreases and vice versa, whereby now the armature will remain positioned on the top edge of the light beam instead of on its bottom edge, as in the first way. Of course, with one stage omitted from the amplifier, the signal strength must be increased by increasing either the 1 megohm resistor adjacent the photo-tube $V_{16}$ or the anode voltage of said tube, or both.

The apparatus, in either the Fig. 1 form or that of Fig. 6, may be used as a gyroscope or for testing the strength of the material of which the armature is made. The means of using it as a gyroscope has already been described. Strength of materials testing is accomplished by spinning the armature at constantly increasing speed until its own centrifugal force causes its destruction by the tensile stresses thus produced. The spin speed variation is readily provided by varying the frequency of the currents that produce the rotating polyphase magnetic field, and the resulting centrifugal force may then be computed from well-known formulas of mechanics, so that the stress at failure of the material may thus be computed when the speed and the dimensions of the armature are known.

Figure 8:
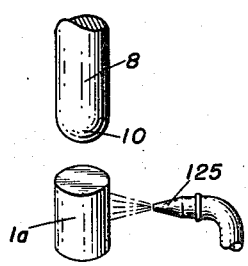
Fig. 8 is a fragmentary perspective view showing another modified form of the invention, that may be used in coating objects.

Referring to Fig. 8, a cylindrical armature $1a$ is shown suspended by the flux from the end 10 of the core 8, and spinning in a revolving field, exactly as is armature 1 of Fig. 1. At 125 is shown a source of coating material, which may be of any suitable composition, and may be mechanically sprayed on the armature $1a$ in air, or evaporated thereon in a vacuum, in the well-known way. Thus, 125 may represent either a nozzle supplied from a source of liquid coating material, or a hot source of evaporated metal, as the case may be. Such coating while the object $1a$ is suspended avoids the need for solid supports for the object to be coated, and gives full access to its entire surface. When, for example, a steel armature is thus coated with another material, it becomes possible to determine the relative adhesion of the coating by spinning the armature at increasing speeds until finally the coating is torn off by the resulting centrifugal force.

Figure 9:
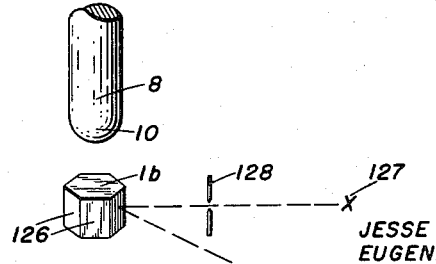
Fig. 9 is a fragmentary perspective view showing a third modified form that may be used as a multiple-faced rotating reflector.

Finally, Fig. 9 shows a rotatable armature $1b$ likewise supported in the field emanating from the lower end 10 of core 8. The armature $1b$ is shown as being of prismatic form with a plurality of optically worked faces 126, parallel to, and located symmetrically with respect to, the axis of rotation of the armature $1b$. A collimated beam of light, coming from a source 127, and passing through an aperture in a diaphragm 128, will strike one of the faces 126 and be reflected thereby. If the armature $1b$ spins slowly enough, it is not necessary to exhaust the air surrounding it, and when thus used the apparatus will suffice for certain manometric flame experiments and similar purposes. When experiments concerning the velocity of light are to be performed, it is, on the contrary, desirable to evacuate the space in which the armature spins, because a high spin speed is necessary, and the aerodynamic friction would be very high in air, and would prevent attainment of the desired speed. It may be remarked, incidentally, that polygonal objects may be spun in vacuo with the same ease as those of circular section, as there is no air drag.

Obviously many modifications and variations of the present invention are possible in the light of the above teachings. It is therefore to be understood that within the scope of the appended claims the invention may be practiced otherwise than as specifically described.

What is claimed is:

1. A gyroscope including an armature containing magnetic material, a vessel enclosing said armature and maintaining a vacuous space about the armature, means for producing a controlled unidirectional magnetic field for suspending said armature freely within said vessel, means for imparting spin to said armature, and a frame mechanically supporting all the above-enumerated elements except said armature.

2. A gyroscope including an armature containing magnetic material, a vessel enclosing said armature and maintaining a vacuous space about the armature, means for producing a controlled unidirectional magnetic field for suspending said armature freely within said vessel, means for imparting spin to said armature, and a frame mechanically supporting all the above-enumerated elements except said armature, said frame being mounted for pivotal movement about the center of the armature.

3. A gyroscope including an armature containing magnetic material, a vessel enclosing the armature and maintaining a vacuous space about said armature, means for producing a controlled unidirectional magnetic field for suspending said armature freely within said vessel, means for imparting spin to said armature, optical means for sighting on said armature to determine the orientation of its axis of spin, and a frame mechanically supporting all the above-enumerated elements except said armature and said optical means.

4. A magnetic suspension apparatus comprising an armature containing magnetic material, a vessel surrounding said armature, means for evacuating said vessel, an electromagnet having a tubular core, said vessel having a portion extending through said core, means for projecting a beam of light on a portion of said armature, some of said light thus being reflected thereby, a photoelectric device subjected to said reflected light, and means controlled by said photoelectric device for energizing the electromagnet with unidirectional current.

5. In a balance, an armature containing magnetic material, a vessel surrounding said armature, means for evacuating said vessel, unidirectional magnetic means for suspending said armature within the vessel, optical means for observing the armature to measure its vertical position, means for projecting a beam of light on said armature, said armature reflecting some of said light, a photoelectric device receiving some of said reflected light, and means controlled by said photoelectric device to vary the strength of the magnetic means.

6. A magnetic suspension apparatus comprising an armature containing magnetic material, an electromagnet having a substantially vertically directed field, said armature being within said field and below the magnet, a winding below said armature and subject to variations in inductance upon vertical motion of said armature, and means responsive to said inductance variations, governing said electromagnet to maintain said armature stably suspended in said magnetic field.

7. A magnetic suspension apparatus comprising an armature containing magnetic material, an electromagnet having a substantially vertically directed field, said armature being within said field and below the magnet, a winding below said armature and subject to variations in inductance upon vertical motion of said armature, means responsive to said inductance variations, governing said electromagnet to maintain said armature stably suspended in said magnetic field, and damping means coacting with said armature to resist horizontal oscillation thereof.

8. A magnetic suspension apparatus comprising an armature containing magnetic material, an electromagnet having a substantially vertically directed field, said armature being within said field and below the magnet, stabilizing means controlling the strength of the magnet and comprising an element sensitive to variations of the vertical position of said armature, to weaken the magnet when the armature rises, means for spinning said armature, and means for discharging coating material upon said armature while it is spinning.

9. A magnetic suspension apparatus comprising an armature containing magnetic material, an electromagnet having a substantially vertically directed field, said armature being within said field and below the magnet, stabilizing means controlling the strength of the magnet and comprising an element sensitive to variations of the vertical position of said armature, to weaken the magnet when the armature rises, said armature having a prismatic portion with reflecting faces parallel to the axis of the prism and symmetrically disposed with respect to said axis, and means for spinning the armature about said axis.

10. A gyroscope comprising an armature containing magnetic material, means for producing a unidirectional magnetic field for freely suspending said armature, means responsive to a change of position of said armature for varying said magnetic field to maintain the armature freely suspended, and means for imparting spin to said armature.

11. A gyroscope comprising an armature containing magnetic material, an evacuated vessel for housing said armature, means for producing a unidirectional magnetic field for freely suspending said armature, means responsive to a change of position of said armature for varying said magnetic field to maintain the armature freely suspended, and means for imparting spin to said armature.

12. A gyroscope comprising an armature containing magnetic material, an evacuated vessel for housing said armature, means for producing a unidirectional magnetic field for freely suspending said armature, means responsive to a change of position of said armature for varying said magnetic field to maintain the armature freely suspended, and means adjacent said armature for producing a rotating field thereby imparting spin to said armature.

References Cited in the file of this patent

UNITED STATES PATENTS

| Number | Name | Date |
| --- | --- | --- |
| 1,589,039 | Anschutz-Kaempfe | June 15, 1926 |
| 2,377,175 | Peer | May 29, 1945 |
| 2,534,824 | Jones | Dec. 10, 1950 |
| 2,566,221 | Lovell | Aug. 28, 1951 |